United States Patent
Zhang et al.

(10) Patent No.: US 12,375,742 B2
(45) Date of Patent: Jul. 29, 2025

(54) METHOD AND SYSTEM FOR PROCESSING INFORMATION IN CDN, DEVICE, AND STORAGE MEDIUM

(71) Applicant: Beijing Volcano Engine Technology Co., Ltd., Beijing (CN)

(72) Inventors: Zhanzhan Zhang, Beijing (CN); Shuang Bao, Beijing (CN); Fei Xie, Beijing (CN); Lin Huang, Beijing (CN); Yixing Sun, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/911,538

(22) Filed: Oct. 10, 2024

(65) Prior Publication Data
US 2025/0119603 A1 Apr. 10, 2025

(30) Foreign Application Priority Data
Oct. 10, 2023 (CN) .......................... 202311307952.3

(51) Int. Cl.
*H04N 21/24* (2011.01)
*H04N 21/2385* (2011.01)

(52) U.S. Cl.
CPC ..... *H04N 21/2402* (2013.01); *H04N 21/2385* (2013.01)

(58) Field of Classification Search
CPC ....................... H04N 21/2402; H04N 21/2385
(Continued)

(56) References Cited

U.S. PATENT DOCUMENTS

| 2003/0053455 A1 | 3/2003 | Kryskow, Jr. |
| 2017/0134592 A1 | 5/2017 | Garg |

(Continued)

FOREIGN PATENT DOCUMENTS

| CN | 105471759 A | 4/2016 |
| CN | 108712307 A | 10/2018 |

(Continued)

OTHER PUBLICATIONS

WO2015184801A1_Description_Dec. 4, 2024_1157 (Year: 2015).*
(Continued)

*Primary Examiner* — Adil Ocak
(74) *Attorney, Agent, or Firm* — Alleman Hall & Tuttle LLP (57) ABSTRACT

The disclosure relates to a method and system for processing information in a content delivery network (CDN). The method includes: obtaining total bandwidth values at respective sampling time points within a management cycle, and arranging the total bandwidth values in chronological order; determining an interval between a first sampling time point and a second sampling time point as a management interval; determining usage ratios of respective bandwidth users according to a first bandwidth value used within the management interval by the bandwidth users sharing the CDN bandwidth, and a second bandwidth value in total used within the management interval by all of the bandwidth users sharing the CDN bandwidth; and managing, based on the usage ratios, bandwidth usage by the respective bandwidth users.

14 Claims, 6 Drawing Sheets

(58) Field of Classification Search
USPC .......................................................... 709/231
See application file for complete search history.

(56) References Cited

U.S. PATENT DOCUMENTS

2019/0109669 A1* 4/2019 Zachman ............ H04L 43/0864
2019/0222531 A1* 7/2019 Lin ..................... H04L 41/5022
2022/0263768 A1* 8/2022 Jiang .................... H04L 47/786

FOREIGN PATENT DOCUMENTS

| CN | 109560978 A | 4/2019 |
| CN | 110493017 A | 11/2019 |
| CN | 110493047 A | 11/2019 |
| CN | 111585824 A | 8/2020 |
| CN | 111614473 A | 9/2020 |
| CN | 113438185 A | 9/2021 |
| CN | 113709582 A | 11/2021 |
| CN | 114391250 A | 4/2022 |
| CN | 114615097 A | 6/2022 |
| CN | 117061354 A | 11/2023 |
| WO | 2023164066 A1 | 8/2023 |

OTHER PUBLICATIONS

China National Intellectual Property Administration, Search Report Issued in Application No. 2023113079523 Oct. 27, 2023, 1 page.
China National Intellectual Property Administration, Supplemental Search Report Issued in Application No. 2023113079523, Dec. 20, 2023, 1 page.
International Search Report and Written Opinion for International Application No. PCT/CN2024/112189, mailed Oct. 21, 2024, 16 pages.
Extended European Search Report for European Application No. 24205651.3, mailed Mar. 3, 2025, 11 pages.

* cited by examiner

METHOD AND SYSTEM FOR PROCESSING INFORMATION IN CDN, DEVICE, AND STORAGE MEDIUM

CROSS-REFERENCE TO RELATED APPLICATION(S)

This application claims priority to Chinese Application No. 202311307952.3 filed on Oct. 10, 2023, the disclosure of which is incorporated herein by reference in its entirety.

FIELD

The disclosure relates to the technical field of the Internet, in particular to a method and system for processing information in a content delivery network (CDN), a device, and a storage medium.

BACKGROUND

A content delivery network (CDN) provider provides services for numerous users to access by providing a network bandwidth sharing platform. In this network environment of bandwidth sharing, a technical problem of processing of bandwidth information of different users arise. At present, in some technologies, such bandwidth information at a specific moment is processed, and bandwidth usage by the users is managed based on a processing result. However, such management of bandwidth usage is ineffective due to inaccuracy in processing results obtained by this data processing method.

In view of this, it is a pressing issue to develop a method for processing information, by which an accurate processing result is guaranteed and the bandwidth usage by the users can be effectively managed.

SUMMARY

In view of this, embodiments of the disclosure provide a method and system for processing information in a content delivery network (CDN), an electronic device, and a computer-readable storage medium, through which a result obtained through bandwidth information processing is more accurate.

One aspect of the disclosure provides a method for processing information in a CDN. The method includes:
obtaining total bandwidth values at sampling time points within a management cycle, and arranging the total bandwidth values in chronological order, where each total bandwidth value represents a sum of bandwidth values used by bandwidth users sharing a CDN bandwidth;
determining an interval between a first sampling time point and a second sampling time point as a management interval, the first sampling time point corresponding to a first total bandwidth value and the second sampling time point corresponding to a second total bandwidth value;
determining usage ratios of the respective bandwidth users according to a first bandwidth value used within the management interval by the bandwidth users sharing the CDN bandwidth, and a second bandwidth value in total used within the management interval by all of the bandwidth users sharing the CDN bandwidth; and
managing, based on the usage ratios, bandwidth usage by the bandwidth users.

Another aspect of the disclosure provides a system for processing information in a CDN. The system includes:
a sampling module configured to obtain total bandwidth values at sampling time points within a management cycle, and arrange the total bandwidth values in chronological order, where each total bandwidth value represents a sum of bandwidth values used by bandwidth users sharing a CDN bandwidth;
an interval division module configured to determine an interval between a first sampling time point and a second sampling time point as a management interval, the first sampling time point corresponding to a first total bandwidth value and the second sampling time point corresponding to a second total bandwidth value;
a ratio determination module configured to determine usage ratios of the respective bandwidth users according to a first bandwidth value used within the management interval by the bandwidth users sharing the CDN bandwidth, and a second bandwidth value in total used within the management interval by all of the bandwidth users sharing the CDN bandwidth; and
a management module configured to manage, based on the usage ratios, bandwidth usage by the bandwidth users.

The yet another aspect of the disclosure further provides a computer-readable storage medium. The computer-readable storage medium stores a computer program which, when executed by a processor, implements the method described above.

The still another aspect of the disclosure further provides an electronic device. The electronic device includes a processor and a memory, where the memory stores a computer program which, when executed by the processor, implements the method described above.

BRIEF DESCRIPTION OF THE DRAWINGS

The features and advantages of the disclosure will be more clearly understood with reference to the accompanying drawings. The accompanying drawings are schematic and should not be construed as limitation to the disclosure in any way. In the figures.

DETAILED DESCRIPTION OF EMBODIMENTS

To make objectives, technical solutions, and advantages of embodiments of the disclosure clearer, the technical solutions in the embodiments of the disclosure will be clearly and completely described below with reference to accompanying drawings in the embodiments of the disclosure. Apparently, the embodiments described are some embodiments rather than all embodiments of the disclosure. All other embodiments derived by a person of ordinary skill in the art from the embodiments of the disclosure without creative efforts should fall within the protection scope of the disclosure.

In a content delivery network (CDN), bandwidth usage by a bandwidth user is managed from aspects including but not limited to usage permission, a permissible maximum bandwidth and usage charge. The bandwidth user may refer to a smallest unit in which bandwidth usage is managed. Specifically, the bandwidth user may refer to a user who uses a CDN service, or a domain name (one user may have a plurality of domain names).

At present, bandwidth usage by the bandwidth user is usually managed by collecting bandwidth information of the bandwidth user during the bandwidth usage, and according to a result obtained after the bandwidth information is processed. The bandwidth information may refer to data generated by the bandwidth user during the bandwidth usage, such as bandwidth values used by bandwidth users at sampling time points and total bandwidth values used by all of the bandwidth users at the sampling time points.

Specifically, in some arts, total bandwidth values used by all bandwidth users are sampled every preset duration within a management cycle, and then the sampled total bandwidth values are arranged in descending order. A total bandwidth value following top 5% of the total bandwidth values is determined as a $95^{th}$ percentile bandwidth value. A sampling time point corresponding to the $95^{th}$ percentile bandwidth value may be determined as a $95^{th}$ percentile time point. A ratio of a bandwidth value used by each bandwidth user at the $95^{th}$ percentile time point to the $95^{th}$ bandwidth value may be used as basis for management of the bandwidth usage by the bandwidth user.

For example, charge management is taken as an example. It is assumed that the management cycle is 30 days and the total bandwidth values used by all the bandwidth users are sampled every 5 minutes, 8640 total bandwidth values may be obtained within 30 days. After these 8640 total bandwidth values are arranged in descending order, the top 5% total bandwidth values refer to top 432 total bandwidth values, then a $433^{rd}$ total bandwidth value is the $95^{th}$ percentile bandwidth value, and the sampling time point corresponding to the $433^{rd}$ total bandwidth value is the $95^{th}$ percentile time point. It is assumed that the $95^{th}$ percentile bandwidth value is 300 bit/s and the bandwidth value used by a bandwidth user A at the $95^{th}$ percentile time point is 100 bit/s, the bandwidth user A needs to bear one third of a bandwidth cost generated within these 30 days.

It can be understood that in this solution that a bandwidth value used by the bandwidth user at a specific time point (that is, the $95^{th}$ percentile time point) is processed and the bandwidth usage by the bandwidth user is managed according to a processing result, the bandwidth usage by the bandwidth user cannot be effectively managed according to the processing result since the obtained processing result cannot accurately reflect bandwidth usage condition of the bandwidth user within the entire management cycle. For example, it is assumed that the $95^{th}$ percentile time point refers to a $15^{th}$ day of the management cycle. The bandwidth user A does not use the bandwidth on a $15^{th}$ day, and uses a high bandwidth from a $16^{th}$ day to a $25^{th}$ day. According to the processing result of the bandwidth information at the $95^{th}$ percentile time point, the bandwidth user A does not need to bear the bandwidth cost. However, in fact, the bandwidth usage by the bandwidth user A from the $16^{th}$ to the $25^{th}$ day has a great impact on the bandwidth cost, and the bandwidth user A should bear the bandwidth cost.

Figure 1:
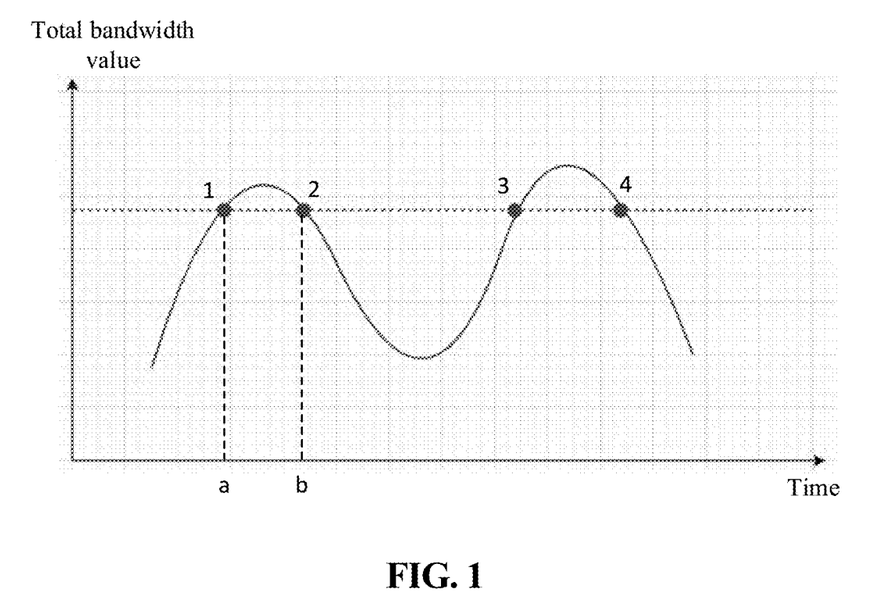
FIG. 1 shows a schematic diagram of a curve of a total bandwidth value changing over time in some arts.

On the other hand, in these arts, if the $95^{th}$ percentile bandwidth value corresponds to a plurality of sampling time points, one of the sampling time points may be randomly selected as the $95^{th}$ percentile time point. In this case, the $95^{th}$ percentile time point selected varies, processing results vary, and the management of bandwidth usage varies accordingly. For example, with reference to FIG. 1, a schematic diagram of a curve of a total bandwidth value changing over time in some arts is shown. In FIG. 1, the total bandwidth value corresponding to a dotted line is the $95^{th}$ percentile bandwidth value. There are four intersections between the dotted line and the curve, that is, total bandwidth values at these four intersections are all $95^{th}$ percentile bandwidth values. These four intersections correspond to four different sampling time points, and one of the sampling time points may be regarded as the $95^{th}$ percentile time point. Apparently, the processing result may vary since the $95^{th}$ percentile time point selected varies. For example, it is assumed that the bandwidth user A does not use the bandwidth at a sampling time point a corresponding to a first intersection, but uses the bandwidth at a sampling time point B corresponding to a second intersection. If the sampling time point A is determined as the $95^{th}$ percentile time point, the bandwidth user A does not use the bandwidth at the $95^{th}$ percentile time point, and does not need to bear the bandwidth cost. However, if the sampling time point b is determined as the $95^{th}$ percentile time point, the bandwidth user A uses the bandwidth at the $95^{th}$ percentile time point and needs to bear the bandwidth cost.

Figure 2:
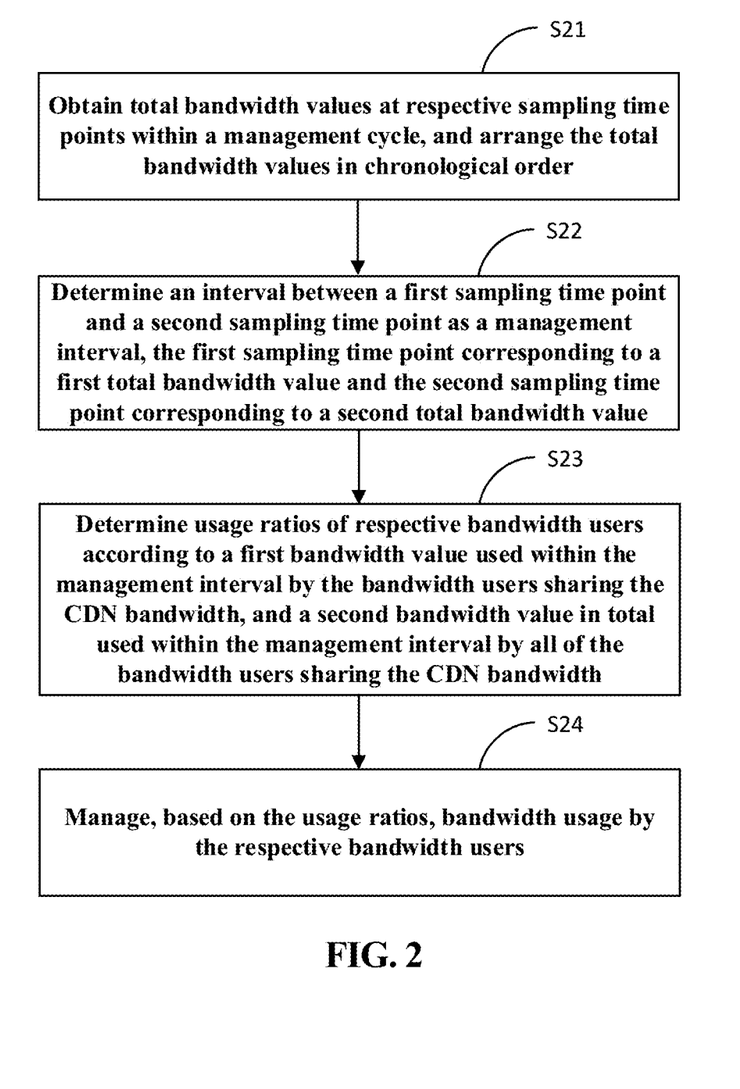
FIG. 2 shows a schematic flowchart of a method for processing information according to an example of the disclosure.

In view of this, the disclosure provides a method for processing information in a CDN. By the method, a result obtained of bandwidth information processing is more accurate and bandwidth usage by the bandwidth user can be effectively managed advantageously. The method for processing information may be applied to an electronic device. The electronic device includes, but is not limited to, a portable android device, a notebook computer and a servers. With reference to FIG. 2, a schematic flowchart of a method for processing information according to an example of the disclosure is shown. The method for processing information in FIG. 2 includes:

S21. Total bandwidth values at sampling time points within a management cycle are obtained, and the total bandwidth values are arranged in chronological order, where each total bandwidth value represents a sum of bandwidth values used by bandwidth users sharing a CDN bandwidth.

The management cycle and the sampling time point may be determined according to actual condition. For example, the management cycle may be one week, one month, one year, etc. Within one management cycle, an interval between two adjacent sampling time points may be 5 minutes, 10 minutes, etc., which is not limited in the disclosure.

Each sampling time point corresponds to one total bandwidth value. Each total bandwidth value is the sum of the bandwidth values used at corresponding sampling time points by the bandwidth users sharing the CDN bandwidth. For example, it is assumed that the bandwidth users sharing the bandwidth include a bandwidth user A and a bandwidth user B. The total bandwidth value 1 at the sampling time point 1 represents a sum of bandwidth values used by the bandwidth user A and the bandwidth user B at the sampling time point 1. The total bandwidth value at the sampling time point 2 represents a sum of bandwidth values used by the bandwidth user A and the bandwidth user B at the sampling time point 2.

Figure 3:
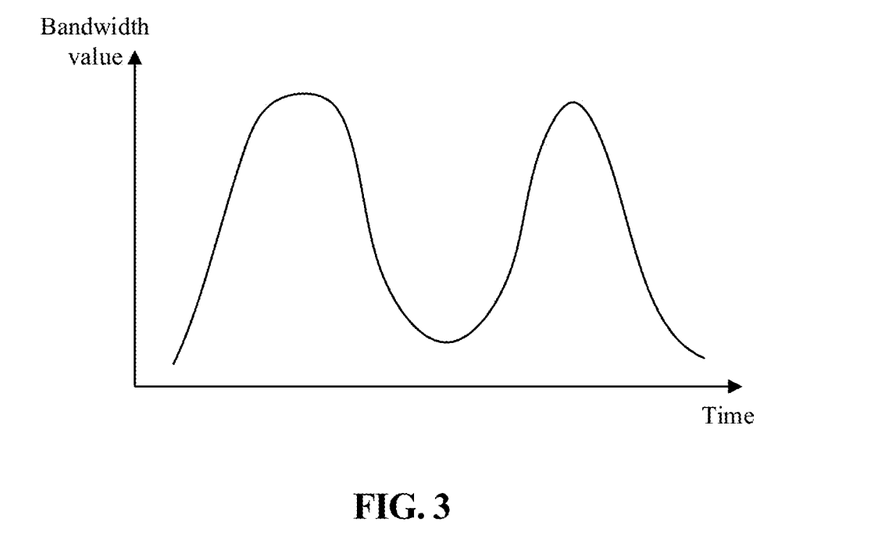
FIG. 3 shows an illustrative diagram of a total bandwidth curve according to an example of the disclosure.

In this example, a total bandwidth curve may be fitted in a coordinate system according to the total bandwidth values at the sampling time points within the management cycle. The X axis of the coordinate system represents time and the Y axis represents a bandwidth value. By fitting the total bandwidth curve, a trend of the total bandwidth value changing over time within the management cycle can be viewed intuitively. With reference to FIG. 3, an illustrative diagram of a total bandwidth curve according to an example of the disclosure is shown. In FIG. 3, it is assumed that the management cycle is from 12 am to 12 pm. Through the trend of the total bandwidth curve, it can be seen that there are two peaks within the management cycle. A first peak may correspond to a morning peak when the bandwidth users use the network frequently, and a second peak may correspond to an evening peak when the bandwidth users use the network frequently.

S22. An interval between a first sampling time point and a second sampling time point is determined as a management interval. The first sampling time point corresponding to a first total bandwidth value and the second sampling time point corresponding to a second total bandwidth value.

Figure 4:
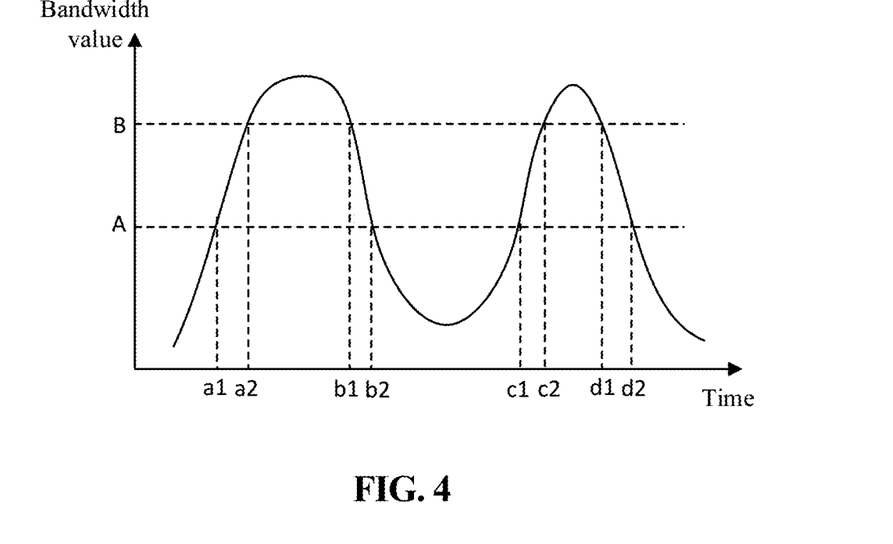
FIG. 4 is a schematic diagram of a management interval determined based on the total bandwidth curve shown in FIG. 3.

Specifically, the first total bandwidth value and the second total bandwidth value may be unequal. When a total bandwidth value of the bandwidth user is between the first total bandwidth value and the second total bandwidth value, it is necessary to manage the bandwidth usage by the bandwidth users. For example, with reference to FIG. 4, a schematic diagram of a management interval determined based on the total bandwidth curve shown in FIG. 3 is shown. In FIG. 4, it is assumed that the first total bandwidth value is a total bandwidth value at a point A and the second total bandwidth value is a total bandwidth value at a point B. Then, within the whole management cycle, four management intervals may be determined, that is, a1-a2, b1-b2, c1-c2 and d1-d2.

S23. Usage ratios of the respective bandwidth users are determined according to a first bandwidth value used within the management interval by the bandwidth users sharing the CDN bandwidth, and a second bandwidth value in total used within the management interval by all of the bandwidth users sharing the CDN bandwidth.

In this example, for a target bandwidth user of the bandwidth users sharing the CDN bandwidth, a usage ratio of the target bandwidth user may be determined as a ratio of the first bandwidth value used by the target bandwidth user to the second bandwidth value. If the usage ratio is great, it means that the target bandwidth user uses a higher bandwidth than the other bandwidth users sharing the CDN bandwidth. If the usage is small, it means that the target bandwidth user uses a lower bandwidth than the other bandwidth users sharing the bandwidth. That is, the usage ratio can accurately reflect the bandwidth usage by the target bandwidth user within the management interval.

S24. Based on the usage ratios, bandwidth usage by the bandwidth users is managed.

For example, for charge management, the bandwidth cost needed to be borne by the respective bandwidth users may be determined according to the usage ratio. Specifically, the greater the usage ratio of the bandwidth user is, the higher bandwidth cost is needed to borne by the bandwidth user.

For example, during bandwidth control, a size of a bandwidth allowed to be used by the bandwidth user who has a greater usage ratio may be appropriately limited, so as to guarantee normal bandwidth usage by the other bandwidth users.

To sum up, in a technical solution of some examples of the disclosure, by determining the management interval, and according to the first bandwidth value used within the management interval by the bandwidth users sharing the CDN bandwidth, and the second bandwidth value in total used within the management interval by the bandwidth users sharing the CDN bandwidth, the usage ratios of the respective bandwidth users are determined, and the bandwidth usage by the bandwidth users is managed according to the usage ratios. Since the management interval is a time interval, and the time interval may include a plurality of sampling time points, after the first bandwidth value used by the bandwidth user within the management interval, and the total second bandwidth value are processed, the usage ratio obtained can be more comprehensive and objective. That is, a result obtained of bandwidth information processing can be more accurate, such that the bandwidth usage by the bandwidth user can be effectively managed advantageously.

For example, it is assumed that the management interval includes a sampling time point A and a sampling time point B, it is assumed that the sampling time point A is a $95^{th}$ percentile time point, and the bandwidth user does not use the bandwidth at the sampling time point A and uses the bandwidth at the sampling time point B. In some arts, since bandwidth user does not use the bandwidth at the sampling time point A, it may be determined that the bandwidth user does not need to bear the bandwidth cost, which is obviously incorrect. However, in the disclosure, since the bandwidth user uses the bandwidth at the sampling time point B within the management interval, it may be determined that the bandwidth user needs to bear the bandwidth cost. Apparently, the determination result of the method of the disclosure is more accurate.

A method for determining the first bandwidth value, the second bandwidth value and the usage ratio will be described below.

In some examples, the second bandwidth value and the first bandwidth value used by the target bandwidth user may be determined by:
- obtaining the first bandwidth value used by the target bandwidth user by summing bandwidth values used by the target bandwidth user at sampling time points within the management interval; and
- obtaining the second bandwidth value by summing total bandwidth values at the sampling time points within the management interval.

For example, it is assumed that there are bandwidth users A, B and C, and there are two management intervals, sampling time points within the first management interval are t1, t2, t3 and t4, and sampling time points within the second management interval are t50, t51 and t52. The bandwidth value is denoted by V. For the bandwidth user A, the first bandwidth value sum(A) obtained by summing bandwidth values at the sampling time points within the management interval may be expressed as follows:

$$\text{sum}(A) = \\ Vt1\_A + Vt2\_A + Vt3\_A + Vt4\_A + Vt50\_A + Vt51\_A + Vt55\_A$$

For the bandwidth user B, the first bandwidth value sum(B) obtained by summing bandwidth values at the sampling time points within the management interval may be expressed as follows:

$$\text{sum}(B) = \\ Vt1\_B + Vt2\_B + Vt3\_B + Vt4\_B + Vt50\_B + Vt51\_B + Vt52\_B$$

For the bandwidth user C, the first bandwidth value sum(C) obtained by summing bandwidth values at the sampling time points within the management interval may be expressed as follows.

$$\text{sum}(C) = \\ Vt1\_C + Vt2\_C + Vt3\_C + Vt4\_C + Vt50\_C + Vt51\_C + Vt52\_C$$

Since the total bandwidth value at the sampling time points is the sum of the bandwidth values used by all of the bandwidth users at corresponding sampling time points, the second bandwidth value sum(T) obtained by summing total bandwidth values at the sampling time points within the management interval may be expressed as follows:

$$\text{sum}(T) = \text{sum}(A) + \text{sum}(B) + \text{sum}(C)$$

The usage ratio of the bandwidth user A may be determined as a ratio sum(A)/sum(T) of sum(A) to sum(T);
The usage ratio of the bandwidth user B may be determined as a ratio sum(B)/sum(T) of sum(B) to sum(T); and
The usage ratio of the bandwidth user C may be determined as a ratio sum(C)/sum(T) of sum(C) to sum(T).

The first bandwidth value and the second bandwidth value are determined through summing, and a computation process is simple. Thus, computation power resources can be saved.

In some other examples, the second bandwidth value and the first bandwidth value used by the target bandwidth user may be determined by:
fitting a total bandwidth curve in a coordinate system according to the total bandwidth values at the sampling time points within the management cycle, where the X axis of the coordinate system represents time and the Y axis represents a bandwidth value;
fitting a target curve of the target bandwidth user in the coordinate system according to bandwidth values used by the target bandwidth user at the sampling time points within the management cycle; and
determining the first bandwidth value used by the target bandwidth user as a size of an area between the target curve and the management interval, and determining the second bandwidth value as a size of an area between the total bandwidth curve and the management interval.

Specifically, the total bandwidth curve and the target curve may be fitted in the same coordinate system.

Figure 5:
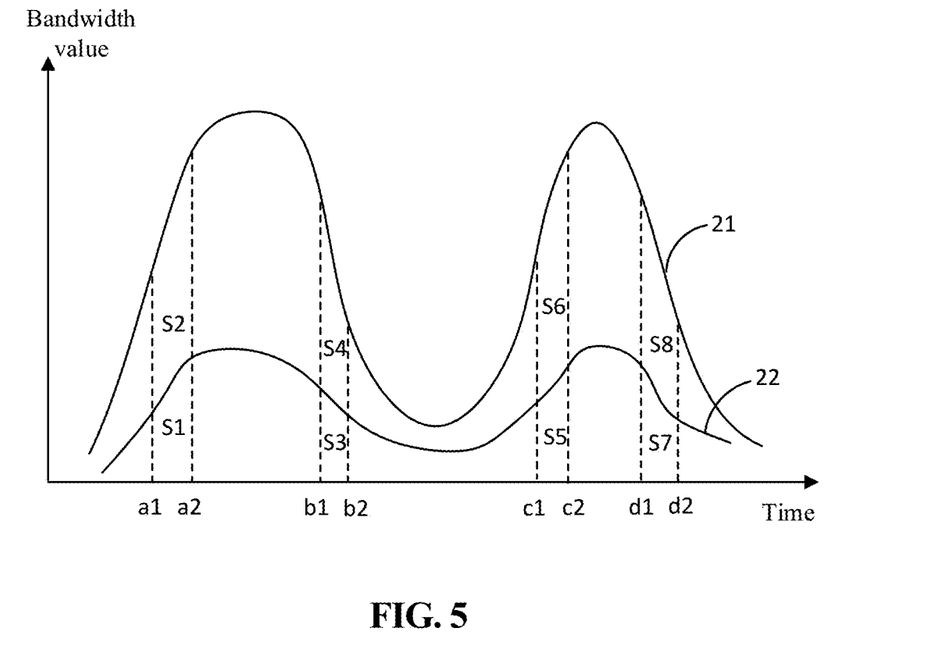
FIG. 5 shows a schematic diagram of a total bandwidth curve and a target curve according to an example of the disclosure.

For the convenience of understanding, with reference to FIG. 5, a schematic diagram of a total bandwidth curve and a target curve according to an example of the disclosure is shown. In FIG. 5, a curve 21 may denote the total bandwidth curve, and a curve 22 may denote a target curve corresponding to the bandwidth user A (that is, the target bandwidth user).

The size S_1 of the area between the target curve and the management interval may be expressed as follows:

$$S\_1 = S1 + S3 + S5 + S7$$

The size S_2 of the area between the total bandwidth curve and the management interval may be expressed as follows:

$$S\_2 = S1 + S3 + S5 + S7 + S2 + S4 + S6 + S8$$

The usage ratio of the bandwidth user A may be determined as a ratio of S_1 to S_2.

Through fitting, the first bandwidth value used by the target bandwidth user is determined as the size of the area between the target curve and the management interval, and the second bandwidth value is determined as the size of the area between the total bandwidth curve and the management interval. Thus, accuracy of the usage ratio obtained can be higher.

Figure 6:
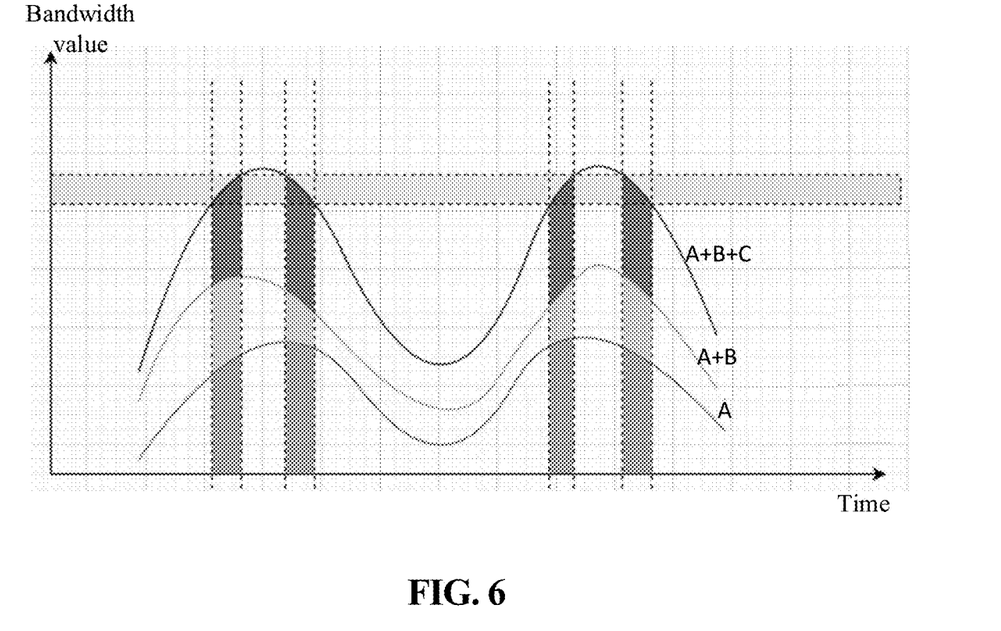
FIG. 6 shows a schematic diagram of total bandwidth curves of bandwidth usage by different numbers of bandwidth users according to an example of the disclosure.

With reference to FIG. 6, a schematic diagram of total bandwidth curves of bandwidth usage by different numbers of bandwidth users according to an example of the disclosure is shown. In FIG. 6, a total bandwidth curve A denotes a total bandwidth curve formed when merely the bandwidth user A uses the bandwidth within the management cycle, a total bandwidth curve A+B denotes a total bandwidth curve formed when the bandwidth user A and the bandwidth user B use the bandwidth within the management cycle, and a total bandwidth curve A+B+C denotes a total bandwidth curve formed when the bandwidth user A, the bandwidth user B and the bandwidth user C use the bandwidth within the management cycle. It can be seen from FIG. 6 that sizes of regions in different colors may correspond to the usage ratios of different bandwidth users within the management cycle. Specifically, a gray region between the total bandwidth curve A and the time axis may denote the usage ratio of the bandwidth user A within the management cycle. A gray region between the total bandwidth curve A+B and the total bandwidth curve A may denote the usage ratio of the bandwidth user B within the management cycle. A gray region between the total bandwidth curve A+B+C and the total bandwidth curve A+B may denote the usage ratio of the bandwidth user C within the management cycle.

Description of determination of the first bandwidth value, the second bandwidth value and the usage ratio is completed hereto.

A method for determining the first total bandwidth value and the second total bandwidth value and the usage ratio will be described below.

In some examples, the first total bandwidth value and the second total bandwidth value may be determined by:

determining a 95$^{th}$ percentile bandwidth value within the management cycle according to the total bandwidth values at the sampling time points within the management cycle; and determining the first total bandwidth value and the second total bandwidth value based on the 95$^{th}$ percentile bandwidth value.

Specifically, the first total bandwidth value and the second total bandwidth value may be determined close to the 95$^{th}$ percentile bandwidth value. In this way, the method of the disclosure can keep the advantages of bandwidth management based on the 95$^{th}$ percentile time point in some arts, and can further solve the inaccuracy problem in these arts.

Specifically, in some examples, the step that the first total bandwidth value and the second total bandwidth value are determined based on the 95$^{th}$ percentile bandwidth value may include:

the first total bandwidth value is determined as one of total bandwidth values that are smaller than the 95$^{th}$ percentile bandwidth value, and the second total bandwidth value is determined as one of total bandwidth values that are greater than the 95$^{th}$ percentile bandwidth value; or alternatively, the first total bandwidth value is determined as the 95$^{th}$ percentile bandwidth value, and the second total bandwidth value is determined as one of total bandwidth values that are smaller or greater than the 95$^{th}$ percentile bandwidth value.

Figure 7:
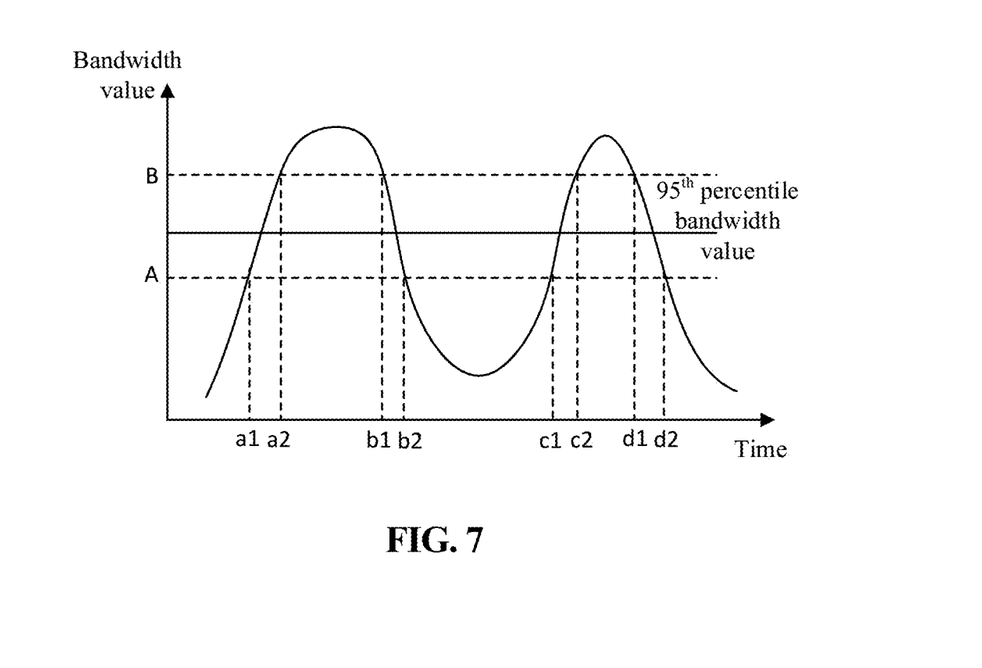
FIG. 7 shows a schematic diagram of a positional relation of a $95^{th}$ percentile bandwidth value with a first total bandwidth value and a second total bandwidth value according to an example of the disclosure.

With reference to FIG. 7, a schematic diagram of a positional relation of a 95$^{th}$ percentile bandwidth value with a first total bandwidth value and a second total bandwidth value according to an example of the disclosure is shown. In FIG. 7, the 95$^{th}$ percentile bandwidth value falls between the first total bandwidth value A and the second total bandwidth value B.

Further, the first total bandwidth value A and the second total bandwidth value B may satisfy a condition as follows:

a ratio of a first number of total bandwidth values between the first total bandwidth value A and the second total bandwidth value B to a second number of the total bandwidth values within the management cycle is not lower than a second threshold. In this way, it can be guaranteed that there are sufficient sampling time points between the first sampling time point corresponding to the first total bandwidth value and the second sampling time point corresponding to the second total bandwidth value, such that the result obtained of bandwidth information processing can be more accurate. For example, it is assumed that the first number is M and the second number is N, and the ratio M/N of the first number M to the second number N is not lower than the second threshold.

Figure 8:
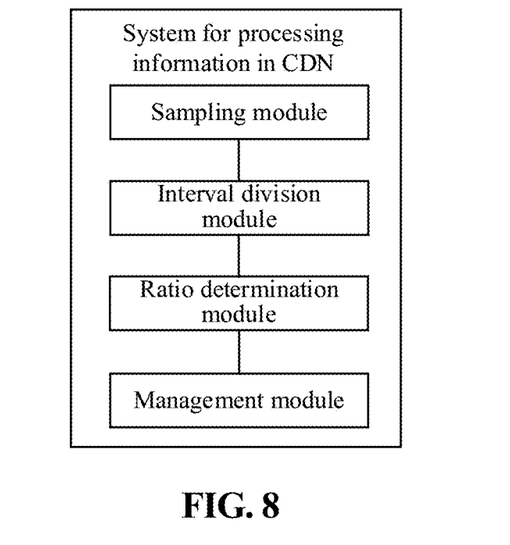
FIG. 8 shows a schematic block diagram of a system for processing information in a content delivery network (CDN) according to an example of the disclosure.

With reference to FIG. 8, a schematic block diagram of a system for processing information in a CDN according to an example of the disclosure is shown. The system for processing information in a CDN in FIG. 8 includes:

a sampling module configured to obtain total bandwidth values at sampling time points within a management cycle, and arrange the total bandwidth values in chronological order, where each total bandwidth value represents a sum of bandwidth values used by bandwidth users sharing a CDN bandwidth;

an interval division module configured to determine an interval between a first sampling time point and a second sampling time point as a management interval, the first sampling time point corresponding to a first total bandwidth value and the second sampling time point corresponding to a second total bandwidth value;

a ratio determination module configured to determine usage ratios of the respective bandwidth users according to a first bandwidth value used within the management interval by the bandwidth users sharing the CDN bandwidth, and a second bandwidth value in total used within the management interval by all of the bandwidth users sharing the CDN bandwidth; and a management module configured to manage, based on the usage ratios, bandwidth usage by the bandwidth users.

In some examples, the ratio determination module is specifically configured to:

for a target bandwidth user of the bandwidth users sharing the CDN bandwidth, determine a usage ratio of the target bandwidth user as a ratio of the first bandwidth value used by the target bandwidth user to the second bandwidth value.

The usage ratio can accurately reflect the bandwidth usage by the target bandwidth user within the management interval.

In some examples, the ratio determination module is specifically configured to:

obtain the first bandwidth value used by the target bandwidth user by summing bandwidth values used by the target bandwidth user at sampling time points within the management interval; and obtain the second bandwidth value by summing total bandwidth values at the sampling time points within the management interval.

The first bandwidth value and the second bandwidth value are determined through summing, and a computation process is simple. Thus, computation power resources can be saved.

In some examples, the ratio determination module is specifically configured to:

fit a total bandwidth curve in a coordinate system according to the total bandwidth values at the sampling time points within the management cycle, where the X axis of the coordinate system represents time and the Y axis represents a bandwidth value;

fit a target curve of the target bandwidth user in the coordinate system according to bandwidth values used by the target bandwidth user at the sampling time points within the management cycle; and determine the first bandwidth value used by the target bandwidth user as a size of an area between the target curve and the management interval, and determine the second bandwidth value as a size of an area between the total bandwidth curve and the management interval.

Through fitting, the first bandwidth value used by the target bandwidth user is determined as the size of the area between the target curve and the management interval, and the second bandwidth value is determined as the size of the area between the total bandwidth curve and the management interval. Thus, accuracy of the usage ratio obtained can be higher.

In some examples, the interval division module is specifically configured to:

determine a 95$^{th}$ percentile bandwidth value within the management cycle according to the total bandwidth values at the sampling time points within the management cycle; and determine the first total bandwidth value and the second total bandwidth value based on the 95$^{th}$ percentile bandwidth value.

In this way, the method of the disclosure can keep the advantages of bandwidth management based on the 95$^{th}$ percentile time point in some arts, and can further solve the inaccuracy problem in these arts.

In some examples, the interval division module is specifically configured to:
determine the first total bandwidth value as one of total bandwidth values that are smaller than the 95$^{th}$ percentile bandwidth value, and determine the second total bandwidth value as one of total bandwidth values that are greater than the 95$^{th}$ percentile bandwidth value; or alternatively,
determine the first total bandwidth value as the 95$^{th}$ percentile bandwidth value, and determine the second total bandwidth value as one of total bandwidth values that are smaller or greater than the 95$^{th}$ percentile bandwidth value.

In this way, the method of the disclosure can keep the management advantages of bandwidth usage based on the 95$^{th}$ percentile time point in some arts, and can further solve the inaccuracy problem in these arts.

In some examples, the interval division module is specifically configured to determine the first total bandwidth value and the second total bandwidth value that satisfy a condition as follows:
a ratio of a first number of total bandwidth values between the first total bandwidth value and the second total bandwidth value to a second number of the total bandwidth values within the management cycle is not lower than a second threshold.

In this way, it can be guaranteed that there are sufficient sampling time points between the first sampling time point corresponding to the first total bandwidth value and the second sampling time point corresponding to the second total bandwidth value, such that the result obtained of bandwidth information processing can be more accurate.

Figure 9:
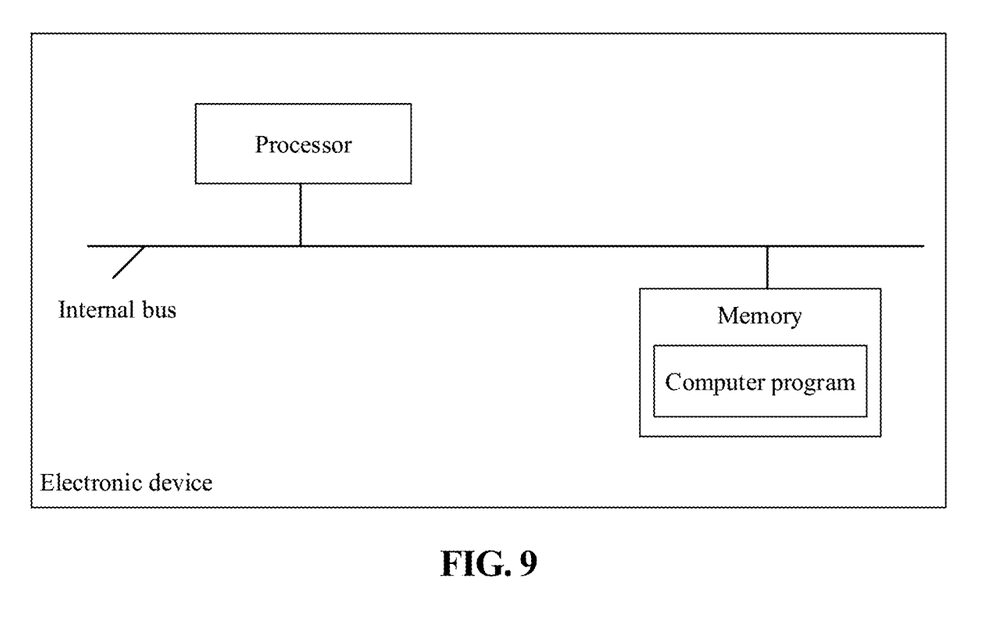
FIG. 9 shows a schematic diagram of an electronic device according to an example of the disclosure.

With reference to FIG. 9, a schematic diagram of an electronic device according to an example of the disclosure is shown. The electronic device includes a processor and a memory, where the memory stores a computer program which, when executed by the processor, implements the method described above.

The processor may be a central processing unit (CPU). The processor may further be a chip such as a different general-purpose processor, a digital signal processor (DSP), an application specific integrated circuit (ASIC), a field-programmable gate array (FPGA), or a different programmable logic device, a discrete gate or transistor logic device, a discrete hardware component, or a combination of the chips.

The memory, a non-transitory computer-readable storage medium, may be configured to store a non-transitory software program, and a non-transitory computer-executable program and module, such as a program instruction/module corresponding to the method in the embodiment of the disclosure. The processor executes various functional applications and data processing of the processor by running the non-transitory software program, instruction and module stored in the memory, so as to implement the method in the method embodiment.

The memory may include a program storage area and a data storage area, where the program storage area may store an operating system and an application program required for at least one function. The data storage area may store data, etc. created by the processor. In addition, the memory may include a high-speed random access memory, and may further include a non-transitory memory such as at least one disk storage device, a flash storage device or a different non-transitory solid-state storage device. In some embodiments, the memory may optionally include a memory that is remotely arranged relative to the processor, and the remote memory may be connected to a processor through a network. Instances of the network described above include, but are not limited to, the Internet, an Intranet, a local area network, a mobile communication network and their combinations.

An embodiment of the disclosure further provides a computer-readable storage medium. The computer-readable storage medium stores a computer program which, when executed by a processor, implements the method described above.

Although the embodiments of the disclosure have been described in conjunction with the accompanying drawings, various modifications and variations can be made by those skilled in the art without departing from the spirit and scope of the disclosure, and such modifications and variations should fall within the scope defined by the appended claims.

We claim:

1. A method for processing information in a content delivery network (CDN), comprising:
obtaining total bandwidth values at respective sampling time points within a management cycle, and arranging the total bandwidth values in chronological order, wherein each of the total bandwidth values represents a sum of bandwidth values used by bandwidth users sharing a CDN bandwidth;
determining an interval between a first sampling time point and a second sampling time point as a management interval, the first sampling time point corresponding to a first total bandwidth value and the second sampling time point corresponding to a second total bandwidth value;
determining usage ratios of respective bandwidth users according to a first bandwidth value used within the management interval by the respective bandwidth users sharing the CDN bandwidth, and a second bandwidth value in total used within the management interval by all of the bandwidth users sharing the CDN bandwidth; and
managing, based on the usage ratios, bandwidth usage by the respective bandwidth users,
wherein determining usage ratios of respective bandwidth users comprises, for a target bandwidth user of the bandwidth users sharing the CDN bandwidth, determining a usage ratio of the target bandwidth user as a ratio of the first bandwidth value used by the target bandwidth user to the second bandwidth value, and
wherein the second bandwidth value and the first bandwidth value used by the target bandwidth user are determined by:
fitting a total bandwidth curve in a coordinate system according to the total bandwidth values at the respective sampling time points within the management cycle, wherein the X axis of the coordinate system represents time and the Y axis represents a bandwidth value;
fitting a target curve of the target bandwidth user in the coordinate system according to bandwidth values used by the target bandwidth user at the respective sampling time points within the management cycle; and
determining the first bandwidth value used by the target bandwidth user as a size of an area defined by the target curve and the management interval, and determining the second bandwidth value as a size of an area defined by the total bandwidth curve and the management interval.

2. The method according to claim 1, wherein the second bandwidth value and the first bandwidth value used by the target bandwidth user are determined by:
obtaining the first bandwidth value used by the target bandwidth user by summing bandwidth values used by the target bandwidth user at the respective sampling time points within the management interval; and
obtaining the second bandwidth value by summing total bandwidth values at the respective sampling time points within the management interval.

3. The method according to claim 1, wherein the first total bandwidth value and the second total bandwidth value are determined by:
determining a $95^{th}$ percentile bandwidth value within the management cycle according to the total bandwidth values at the sampling time points within the management cycle; and
determining the first total bandwidth value and the second total bandwidth value based on the $95^{th}$ percentile bandwidth value.

4. The method according to claim 3, wherein determining the first total bandwidth value and the second total bandwidth value based on the $95^{th}$ percentile bandwidth value comprises:
determining the first total bandwidth value as one of total bandwidth values that are smaller than the $95^{th}$ percentile bandwidth value, and determining the second total bandwidth value as one of total bandwidth values that are greater than the $95^{th}$ percentile bandwidth value; or alternatively,
determining the first total bandwidth value as the $95^{th}$ percentile bandwidth value, and determining the second total bandwidth value as one of total bandwidth values that are smaller or greater than the $95^{th}$ percentile bandwidth value.

5. The method according to claim 4, wherein the first total bandwidth value and the second total bandwidth value satisfy a condition as follows:
a ratio of a first number of total bandwidth values between the first total bandwidth value and the second total bandwidth value to a second number of the total bandwidth values within the management cycle is not lower than a second threshold.

6. A non-transitory computer-readable storage medium storing a computer program which, when executed by a processor, implements a method comprising: obtaining total bandwidth values at respective sampling time points within a management cycle, and arranging the total bandwidth values in chronological order, wherein each of the total bandwidth values represents a sum of bandwidth values used by bandwidth users sharing a CDN bandwidth;
determining an interval between a first sampling time point and a second sampling time point as a management interval, the first sampling time point corresponding to a first total bandwidth value and the second sampling time point corresponding to a second total bandwidth value;
determining usage ratios of respective bandwidth users according to a first bandwidth value used within the management interval by the respective bandwidth users sharing the CDN bandwidth, and a second bandwidth value in total used within the management interval by all of the bandwidth users sharing the CDN bandwidth; and
managing, based on the usage ratios, bandwidth usage by the respective bandwidth users,
wherein determining usage ratios of respective bandwidth users comprises, for a target bandwidth user of the bandwidth users sharing the CDN bandwidth, determining a usage ratio of the target bandwidth user as a ratio of the first bandwidth value used by the target bandwidth user to the second bandwidth value, and
wherein the second bandwidth value and the first bandwidth value used by the target bandwidth user are determined by:
fitting a total bandwidth curve in a coordinate system according to the total bandwidth values at the respective sampling time points within the management cycle, wherein the X axis of the coordinate system represents time and the Y axis represents a bandwidth value;
fitting a target curve of the target bandwidth user in the coordinate system according to bandwidth values used by the target bandwidth user at the respective sampling time points within the management cycle; and
determining the first bandwidth value used by the target bandwidth user as a size of an area defined by the target curve and the management interval, and determining the second bandwidth value as a size of an area defined by the total bandwidth curve and the management interval.

7. The non-transitory computer-readable storage medium according to claim 6, wherein the second bandwidth value and the first bandwidth value used by the target bandwidth user are determined by:
obtaining the first bandwidth value used by the target bandwidth user by summing bandwidth values used by the target bandwidth user at the respective sampling time points within the management interval; and
obtaining the second bandwidth value by summing total bandwidth values at the respective sampling time points within the management interval.

8. The non-transitory computer-readable storage medium according to claim 6, wherein the first total bandwidth value and the second total bandwidth value are determined by:
determining a $95^{th}$ percentile bandwidth value within the management cycle according to the total bandwidth values at the sampling time points within the management cycle; and
determining the first total bandwidth value and the second total bandwidth value based on the $95^{th}$ percentile bandwidth value.

9. The non-transitory computer-readable storage medium according to claim 8, wherein determining the first total bandwidth value and the second total bandwidth value based on the $95^{th}$ percentile bandwidth value comprises:
determining the first total bandwidth value as one of total bandwidth values that are smaller than the $95^{th}$ percentile bandwidth value, and determining the second total bandwidth value as one of total bandwidth values that are greater than the $95^{th}$ percentile bandwidth value; or alternatively,
determining the first total bandwidth value as the $95^{th}$ percentile bandwidth value, and determining the second total bandwidth value as one of total bandwidth values that are smaller or greater than the $95^{th}$ percentile bandwidth value.

10. The non-transitory computer-readable storage medium according to claim 9, wherein the first total bandwidth value and the second total bandwidth value satisfy a condition as follows:
    a ratio of a first number of total bandwidth values between the first total bandwidth value and the second total bandwidth value to a second number of the total bandwidth values within the management cycle is not lower than a second threshold.

11. An electronic device, comprising a processor and a memory, wherein the memory stores a computer program which, when executed by the processor, implements a method comprising:
    obtaining total bandwidth values at respective sampling time points within a management cycle, and arranging the total bandwidth values in chronological order, wherein each of the total bandwidth values represents a sum of bandwidth values used by bandwidth users sharing a CDN bandwidth;
    determining an interval between a first sampling time point and a second sampling time point as a management interval, the first sampling time point corresponding to a first total bandwidth value and the second sampling time point corresponding to a second total bandwidth value;
    determining usage ratios of respective bandwidth users according to a first bandwidth value used within the management interval by the respective bandwidth users sharing the CDN bandwidth, and a second bandwidth value in total used within the management interval by all of the bandwidth users sharing the CDN bandwidth; and
    managing, based on the usage ratios, bandwidth usage by the respective bandwidth users,
    wherein determining usage ratios of respective bandwidth users comprises, for a target bandwidth user of the bandwidth users sharing the CDN bandwidth, determining a usage ratio of the target bandwidth user as a ratio of the first bandwidth value used by the target bandwidth user to the second bandwidth value, and
    wherein the second bandwidth value and the first bandwidth value used by the target bandwidth user are determined by:
        fitting a total bandwidth curve in a coordinate system according to the total bandwidth values at the respective sampling time points within the management cycle, wherein the X axis of the coordinate system represents time and the Y axis represents a bandwidth value;
        fitting a target curve of the target bandwidth user in the coordinate system according to bandwidth values used by the target bandwidth user at the respective sampling time points within the management cycle; and
        determining the first bandwidth value used by the target bandwidth user as a size of an area defined by the target curve and the management interval, and determining the second bandwidth value as a size of an area defined by the total bandwidth curve and the management interval.

12. The electronic device according to claim 11, wherein the second bandwidth value and the first bandwidth value used by the target bandwidth user are determined by:
    obtaining the first bandwidth value used by the target bandwidth user by summing bandwidth values used by the target bandwidth user at the respective sampling time points within the management interval; and
    obtaining the second bandwidth value by summing total bandwidth values at the respective sampling time points within the management interval.

13. The electronic device according to claim 11, wherein the first total bandwidth value and the second total bandwidth value are determined by:
    determining a $95^{th}$ percentile bandwidth value within the management cycle according to the total bandwidth values at the sampling time points within the management cycle; and
    determining the first total bandwidth value and the second total bandwidth value based on the $95^{th}$ percentile bandwidth value.

14. The electronic device according to claim 13, wherein determining the first total bandwidth value and the second total bandwidth value based on the $95^{th}$ percentile bandwidth value comprises:
    determining the first total bandwidth value as one of total bandwidth values that are smaller than the $95^{th}$ percentile bandwidth value, and determining the second total bandwidth value as one of total bandwidth values that are greater than the $95^{th}$ percentile bandwidth value; or alternatively,
    determining the first total bandwidth value as the $95^{th}$ percentile bandwidth value, and determining the second total bandwidth value as one of total bandwidth values that are smaller or greater than the $95^{th}$ percentile bandwidth value.

\* \* \* \* \*